US007962243B2

(12) United States Patent
Deguire et al.

(10) Patent No.: US 7,962,243 B2
(45) Date of Patent: Jun. 14, 2011

(54) WEAPON ROBOT WITH SITUATIONAL AWARENESS

(75) Inventors: Daniel R. Deguire, Blackstone, MA (US); Kurt Bruck, Providence, RI (US); John Young, Sutton, MA (US); Alex Kirillov, Littleton, MA (US); James Chung, Brookline, MA (US)

(73) Assignee: Foster-Miller, Inc., Waltham, MA (US)

( * ) Notice: Subject to any disclaimer, the term of this patent is extended or adjusted under 35 U.S.C. 154(b) by 739 days.

(21) Appl. No.: 12/004,173

(22) Filed: Dec. 19, 2007

(65) Prior Publication Data

US 2009/0164045 A1 Jun. 25, 2009

(51) Int. Cl.
*G01C 21/00* (2006.01)
(52) U.S. Cl. .......................................... 700/259; 901/1
(58) Field of Classification Search .................. 700/259, 700/262, 251; 901/1; 89/41.02, 41.18; 446/435; 342/357.25
See application file for complete search history.

(56) References Cited

U.S. PATENT DOCUMENTS

| | | | | |
|---|---|---|---|---|
| 3,400,393 | A * | 9/1968 | Ash | 342/61 |
| 4,380,135 | A * | 4/1983 | Wildman et al. | 446/433 |
| 4,621,562 | A | 11/1986 | Carr et al. | |
| 4,932,831 | A * | 6/1990 | White et al. | 414/732 |
| 5,022,812 | A * | 6/1991 | Coughlan et al. | 414/729 |
| 5,353,681 | A | 10/1994 | Sugg | |
| 6,113,343 | A | 9/2000 | Goldenberg et al. | |
| 6,269,730 | B1 | 8/2001 | Hawkes et al. | |
| 6,535,793 | B2 * | 3/2003 | Allard | 700/259 |
| 6,578,464 | B2 | 6/2003 | Ebersole, Jr. et al. | |
| 6,745,663 | B2 | 6/2004 | Ebersole, Jr. et al. | |
| 6,789,456 | B2 | 9/2004 | DeRoos et al. | |
| 6,860,206 | B1 * | 3/2005 | Rudakevych et al. | 102/206 |
| 6,889,594 | B2 | 5/2005 | Ebersole, Jr. et al. | |
| 6,986,302 | B2 * | 1/2006 | LaFata | 89/1.11 |
| 7,104,863 | B2 * | 9/2006 | Mimlitch et al. | 446/94 |
| 7,143,696 | B2 * | 12/2006 | Rudakevych et al. | 102/215 |
| 7,239,976 | B2 * | 7/2007 | Coleman et al. | 702/153 |
| 7,650,826 | B2 * | 1/2010 | Son et al. | 89/27.3 |
| 7,724,188 | B2 * | 5/2010 | Liu | 342/359 |
| 7,798,264 | B2 * | 9/2010 | Hutcheson et al. | 180/65.1 |

(Continued)

OTHER PUBLICATIONS

Written Opinion from International Application No. PCT/US2008/008700, 4 pgs. (unnumbered), mailed Feb. 17, 2009.

(Continued)

*Primary Examiner* — Khoi Tran
*Assistant Examiner* — Jason Holloway
(74) *Attorney, Agent, or Firm* — Iandiorio Teska & Coleman

(57) ABSTRACT

A mobile, remotely controlled robot includes a turret subsystem, a robot controller subsystem configured to control the robot, control the turret, and fire the weapon, a robot navigation subsystem configured to determine the position of the robot, a turret orientation determination subsystem, and a robot communications subsystem for receiving commands and for transmitting robot position data and turret orientation data. An operator control unit includes a user interface for commanding the robot, the turret, and the weapon. An operator control unit communications subsystem transmits commands to the robot and receives robot position data and turret orientation data from the robot. An operator control unit navigation subsystem is configured to determine the position of the operator control unit. An operator control unit controller subsystem is responsive to the robot position data, the turret orientation data, and the operator control unit position and is configured to determine if the weapon is aimed at the operator control unit within a predetermined fan angle.

17 Claims, 6 Drawing Sheets

U.S. PATENT DOCUMENTS

| | | | |
|---|---|---|---|
| 2001/0045883 A1* | 11/2001 | Holdaway et al. | 340/5.51 |
| 2002/0037508 A1 | 3/2002 | Cargill et al. | |
| 2004/0050240 A1* | 3/2004 | Greene et al. | 89/41.06 |
| 2004/0216932 A1 | 11/2004 | Giovanetti et al. | |
| 2005/0024634 A1* | 2/2005 | Barker et al. | 356/301 |
| 2006/0037508 A1* | 2/2006 | Rudakevych et al. | 102/206 |
| 2006/0050929 A1* | 3/2006 | Rast et al. | 382/103 |
| 2006/0223637 A1 | 10/2006 | Rosenberg | |
| 2007/0057842 A1* | 3/2007 | Coleman et al. | 342/359 |
| 2007/0204745 A1* | 9/2007 | Son et al. | 89/27.3 |
| 2007/0208459 A1* | 9/2007 | Choi | 700/245 |
| 2007/0209501 A1* | 9/2007 | Ko | 89/40.01 |
| 2007/0236384 A1* | 10/2007 | Ivtsenkov et al. | 342/45 |
| 2008/0001064 A1* | 1/2008 | Thomas et al. | 250/206.1 |
| 2008/0034954 A1* | 2/2008 | Grober | 89/41.05 |
| 2008/0063400 A1* | 3/2008 | Hudson et al. | 398/106 |
| 2008/0105481 A1* | 5/2008 | Hutcheson et al. | 180/209 |
| 2008/0266254 A1* | 10/2008 | Robbins et al. | 345/161 |
| 2009/0045996 A1* | 2/2009 | Ivtsenkov et al. | 342/45 |
| 2009/0232506 A1* | 9/2009 | Hudson et al. | 398/106 |
| 2011/0005847 A1* | 1/2011 | Andrus et al. | 180/9.1 |

OTHER PUBLICATIONS

Northrop Grumman Remotec ANDROS F6A Heavy Duty Robot, http://www.es.northropgrumman.com/remotec/f6a.htm (1 pg).

Northrop Grumman Remotec ANDROS F6A Heavy Duty Robot, http://www.es.northropgrumman.com/remotec/details/f6a_specs.htm (2 pgs.).

Northrop Grumman Remotec ANDROS Wolverine Robot, http://www.es.northropgrumman.com/remotec/wolverine.htm (1 pg).

Northrop Grumman Remotec ANDROS Mark V-Al Hazardous Duty Robot, http://www.es.northropgrumman.com/remotec/markval.htm (2pgs).

Battelle, Law Enforcement Technology Assessment, TWSWG Task T-150B2, Apr. 2000, (86 pgs).

AB Precision (Poole) Ltd, 1 Fleets Lane, Poole, Dorset, BH15 3BZ, United Kingdom, On-Line Catalog from website http://www.abprecision.co.uk, Jan. 19, 2007.

U.S. Appl. No. 11/543,427, filed Oct. 10, 2006, Deguire et al.

Proparms Ltd., 2930 Chemic Ste-Therese, Carignan, QC, Canada J3L 2B2, On-Line Catalog from website http://www/proparms.com/site/product_22.html Jan. 19, 2007.

* cited by examiner

WEAPON ROBOT WITH SITUATIONAL AWARENESS

FIELD OF THE INVENTION

The subject invention relates to robotics and to remotely controlled mobile robots equipped with weapons.

BACKGROUND OF THE INVENTION

The notion of a mobile remotely controlled robot with a weapon mounted thereto is intriguing. The robot could be maneuvered into a hostile situation and the weapon fired by an operator positioned out of harms way. For the deployment of such a robot, several safety concerns need to be met. Co-pending U.S. patent application Ser. No. 11/732,875 filed Apr. 5, 2007 details various systems and methods for ensuring the weapon on a robot is not fired unless the operator so intends.

In the field, the robot typically begins at a position proximate the operator using an operator control unit (OCU) to maneuver the robot. As the robot is controlled by the operator using the operator control unit (OCU), the robot may be maneuvered out of sight of the operator. Indeed, the operator and the OCU may also move from the original starting position. Cameras on the robot can be used to show the operator objects within the field of view of the robot, but it can be difficult for the operator to decipher where the robot is in relation to the operator, how the robot is orientated, and its direction of travel. The orientation of the robot weapon with respect to the operator may not be known.

The result is that it is possible that the operator can command the robot to fire the weapon when the weapon is aimed at the operator.

BRIEF SUMMARY OF THE INVENTION

It is therefore an object of this invention to provide a new mobile remotely controlled robot system.

It is a further object of this invention to provide such a system which provides situational awareness for the operator.

It is a further object of this invention to provide such a system which lowers the likelihood that the operator could control the robot weapon to fire on the operator's position.

The subject invention results from the realization that situational awareness for a robot carrying a weapon and controlled by an operator control unit is effected by enabling the operator control unit to track the robot's position, the orientation of the weapon turret, and the position of the operator control unit so that it can be determined if the weapon is aimed at the operator control unit. In one preferred embodiment, situational awareness is provided by depicting on the operator control unit a graphical representation of the robot, the weapon, and the operator control unit position. Also, one or more predetermined actions can be taken if it is determined that the weapon is aimed at the operator control unit.

This invention features a mobile, remotely controlled robot system. The mobile, remotely controlled robot includes a turret subsystem, a robot controller subsystem configured to control the robot, control the turret, and fire the weapon. A robot navigation subsystem is configured to determine the position of the robot. A turret orientation determination subsystem determines the orientation of the turret and weapon. A robot communications subsystem receives commands from the operator control unit and transmits robot position data and turret orientation data to the operator control unit. The operator control unit includes a user interface for commanding the robot, the turret, and the weapon. The operator control unit communications subsystem transmits commands to the robot and receives robot position data and turret orientation data from the robot. An operator control unit navigation subsystem is configured to determine the position of the operator control unit. The operator control unit controller subsystem is responsive to the robot position data, the turret orientation data, and the operator control unit position and is configured to determine if the weapon is aimed at the operator control unit within a predetermined fan angle (e.g. 0°-10°).

The operator control unit controller subsystem can be configured to take a predetermined action if the weapon is aimed at the operator control unit within a predetermined fan angle. One such action includes providing an alert to the user interface. Another action includes disabling any user interface weapon command so the weapon cannot be fired.

Typically, the user interface includes a monitor and the operator control unit controller subsystem is furthered configured to display on the monitor a graphical representation of the robot turret relative to the location of the operator control unit. In one example, the operator control unit controller subsystem is configured to display a graphical representation of the robot and the orientation of the turret relative to the robot and to display a graphical representation of the direction of the robot from the operator control unit. When the robot includes a camera, a camera orientation determination subsystem may be included and the operator control unit controller subsystem is responsive to the camera orientation determination subsystem and is configured to display a graphical representation of the orientation of the camera.

One mobile, remotely controlled robot system in accordance with the subject invention features a weapon mounted to a robot, a robot controller subsystem configured to fire the weapon, a weapon orientation determination subsystem, and a robot communication subsystem for receiving commands and transmitting weapon orientation data. A user interface is for commanding the robot and the weapon and a communication subsystem is for transmitting commands to the robot and for receiving weapon orientation data from the robot. An operator control unit controller subsystem is responsive to the weapon orientation data and is configured to determine if the weapon is aimed at the operator control unit.

Typically, the weapon is mounted to the robot via a turret subsystem and the weapon orientation determination subsystem includes encoders which keep track of the position of the turret. The robot also typically includes a navigation subsystem configured to determine the position of the robot and the operator control unit typically includes a navigation subsystem configured to determine the position of the operator control unit.

A mobile, remotely controlled robot system in accordance with the subject invention may include means for determining the position of the robot and means for determining the orientation of the turret. Further included are means for determining the position the position of the operator control unit and means, responsive to robot position data, turret orientation data, and the operator control unit position, for determining if the weapon is aimed at the operator control unit.

A mobile, remotely controlled robot system in accordance with the subject invention may include a mobile, remotely controlled robot including a turret subsystem, a robot controller subsystem configured to control the robot, control the turret, and fire the weapon, a robot navigation subsystem configured to determine the position of the robot, a turret orientation determination subsystem, and a robot communications subsystem for receiving commands and for transmitting robot position data and turret orientation data.

An operator control unit may include a user interface for commanding the robot, the turret, and the weapon. An operator control unit communications subsystem is for transmitting commands to the robot and for receiving robot position data and turret orientation data from the robot. An operator control unit navigation subsystem is configured to determine the position of the operator control unit, and an operator control unit controller subsystem is responsive to the robot position data, the turret orientation data, and the operator control unit position and is configured to display on a monitor a graphical representation of the turret relative to the location of the operator control unit and a graphical representation of the robot and the orientation of the turret relative to the robot.

One mobile, remotely controlled robot in accordance with the subject invention features a robot controller subsystem configured to control the robot, control the turret, and fire the weapon. A robot navigation subsystem is configured to determine the position of the robot. A turret orientation determination subsystem determines the orientation of the turret. A robot communications subsystem receives commands and transmits robot position data and turret orientation data.

An operator control unit in accordance with the subject invention features a user interface for commanding the robot, the turret, and the weapon. An operator control unit communications subsystem transmits commands to the robot and receives robot position data and turret orientation data from the robot. An operator control unit navigation subsystem is configured to determine the position of the operator control unit. An operator control unit controller subsystem is responsive to the robot position data, the turret orientation data, and the operator control unit position and is configured to take a predetermined action if the weapon is aimed at the operator control unit within a predetermined fan angle. One action includes providing an alert to the user interface. Another action includes disabling any user interface weapon command so the weapon cannot be fired.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
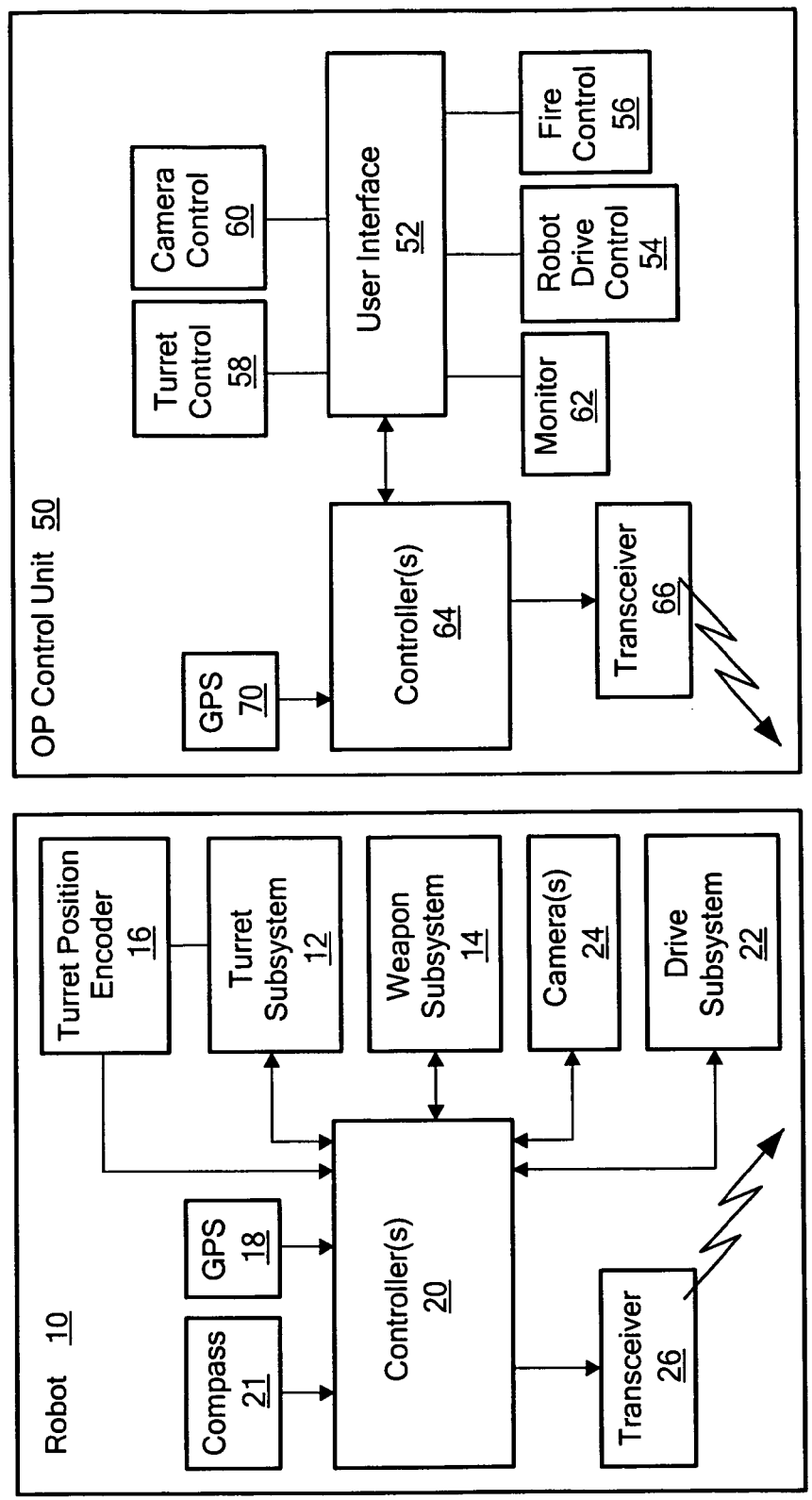
FIG. 1 is a highly schematic block diagram showing the primary components associated with a robot and an operator control unit in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Robot 10, FIG. 1 in accordance with an example of this invention, typically mobile and remotely controlled, includes a turret subsystem 12 for a weapon mounted thereto. In the embodiment shown in FIG. 2, turret 12 can rotate 360° and pitch weapon 14 up 60° and down to 20°. Devices such as encoders 16, FIG. 1 keep track of the angular pitch position of the turret and weapon. Encoders are also typically used to keep track of the current orientation of camera 24. Other orientation determination subsystems for the turret, weapon, and camera, however, are possible. A navigation subsystem, such as global positioning system (GPS) unit 18, determines the position of the robot as it maneuvers typically by longitude, latitude, and elevation. GPS unit 18 is also able to keep track of the robot's maneuvers in the field and can be used in association with various maps and/or satellite imagery to show the location of the robot relative to locations, buildings, and the like depicted on the map or satellite imagery. Compass 21 may be used to orient robot 10 and to determine its heading and/or to determine the orientation of the turret.

Figure 4:
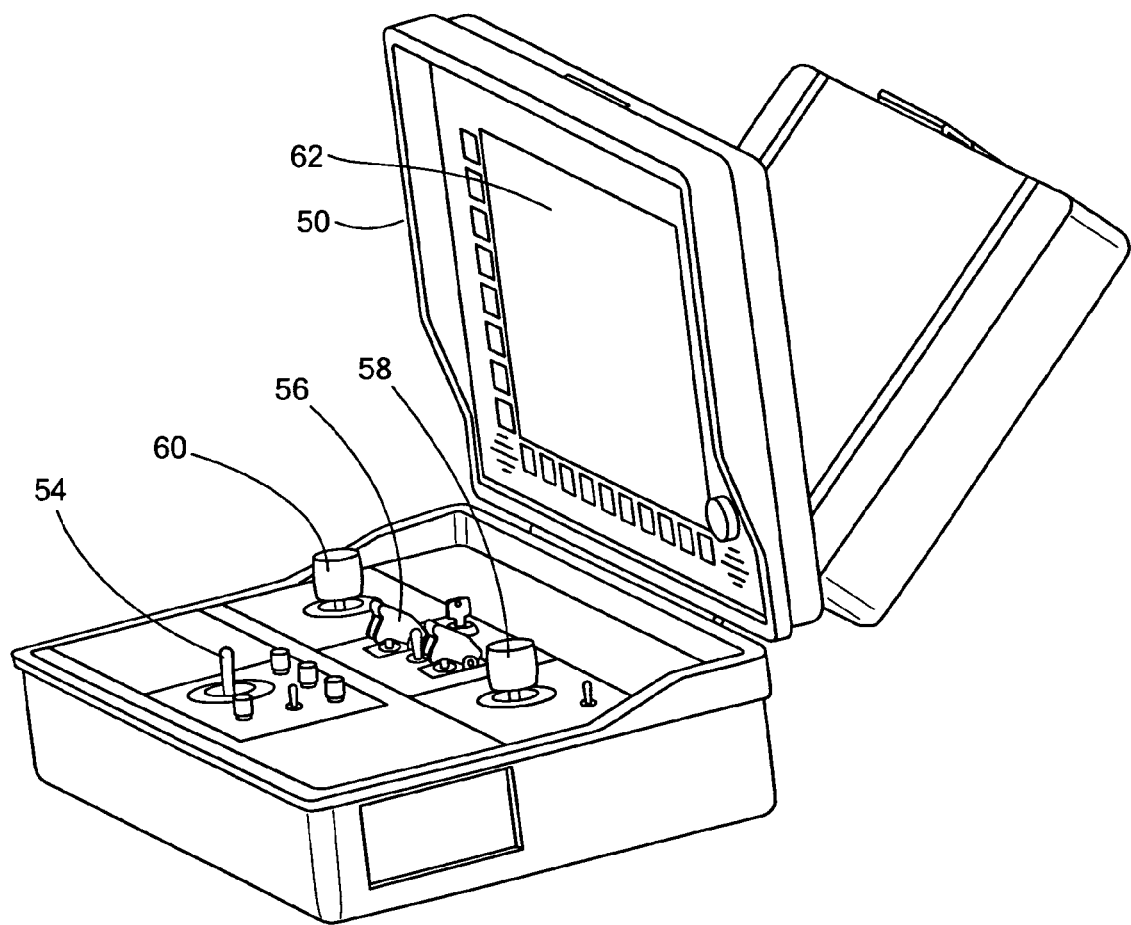
FIG. 4 is a schematic three-dimensional view showing an example of an operator control unit in accordance with the subject invention.

Controller system 20, which typically includes one or more microcontrollers and/or microprocessors, controls the robot drive system 22, turret subsystem 12, weapon subsystem 14 (to fire the weapon), one or more cameras 24, as well as other robot subsystems based on the commands received by transceiver 26 from operator control unit 50 (see also FIG. 4). Controller system 20 also processes signals received from GPS 18, turret position encoders 16, and camera(s) 24, and compass 21 as well as from other subsystems and relays data relating to the position of the robot, the orientation of the turret (and weapon) (both angular orientation and pitch) as well as other data to operator control unit 50. Co-pending U.S. application Ser. No. 11/732,875 filed on Apr. 5, 2007 discloses additional details of one preferred robot and operator control unit in accordance with the subject invention. Application Ser. No. 60/994,414 filed on Sep. 19, 2007 discloses additional details concerning a preferred operator control unit in accordance with the subject invention. Both of these prior applications are incorporated herein by this reference.

Operator control unit 50 includes, in this example, user interface 52 typically including various knobs, switches, joysticks, and the like (see FIG. 4) for maneuvering robot 10, for controlling the movement of the turret and cameras, for firing the weapon, and so on. FIG. 1 depicts robot drive control 54, fire control 56, turret control 58, and camera control 60 for displaying video feeds from camera 24. The user interface typically also includes monitor 62 for showing such video feeds from the camera or cameras associated with the robot.

One or more microcontrollers and/or microprocessors 64 process the signals from user interface 52 and transceiver 66 wirelessly provides the user commands to transceiver 26 of robot 10. Similarly, controller 64 processes signals received by operator control unit transceiver 66 from robot 10.

Operator control unit 50 also includes a navigation system such as GPS unit 70 for determining the position of operator control unit 50 typically including latitude, longitude and elevation data. Based on this information and information received from robot 10 including the position of the robot and the orientation of the turret and weapon, controller 64 is able to calculate if the weapon is aimed at the operator control unit within a pre-determined fan angle, typically between 0 and 10 degrees. And, if such is the case, the appropriate action can be taken.

Figure 2:
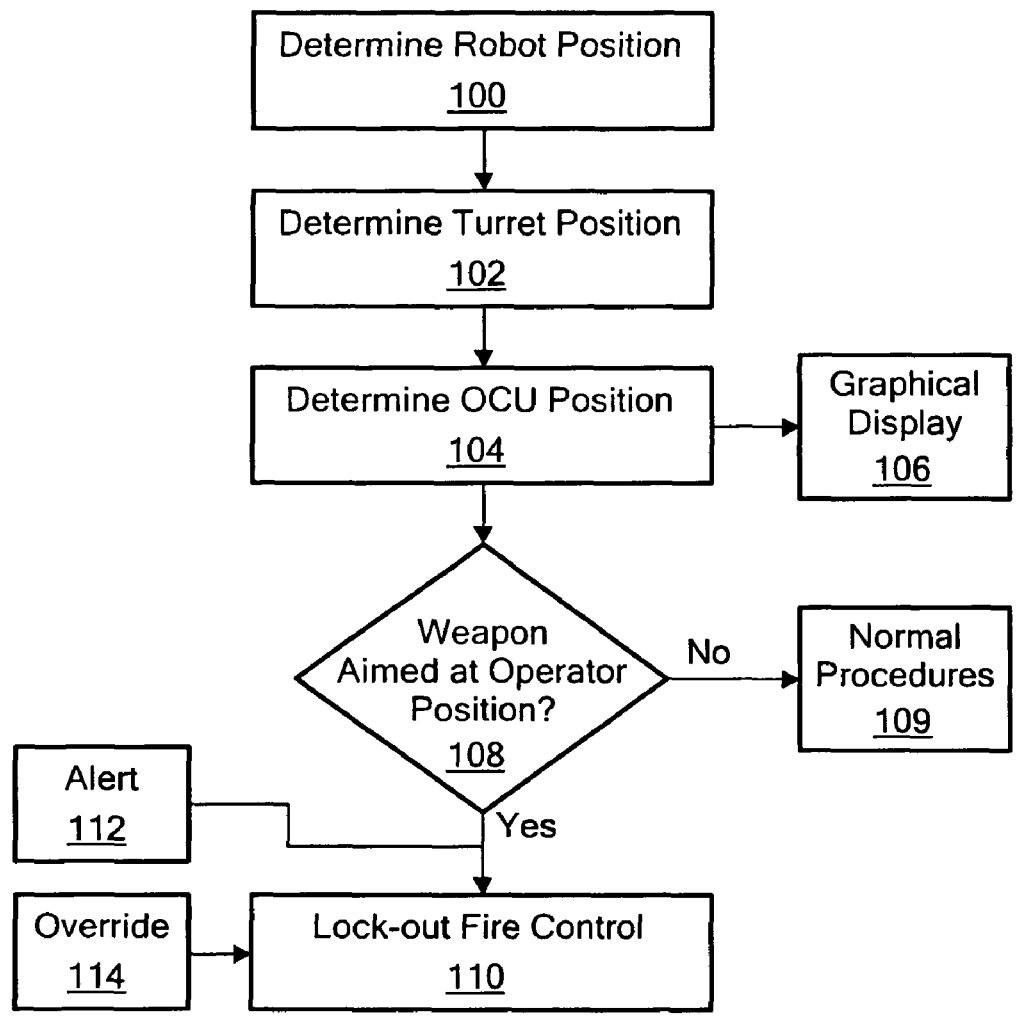
FIG. 2 is a high level flow chart depicting the primary operations associated with a controller subsystem in accordance with the subject invention.
Figure 3:
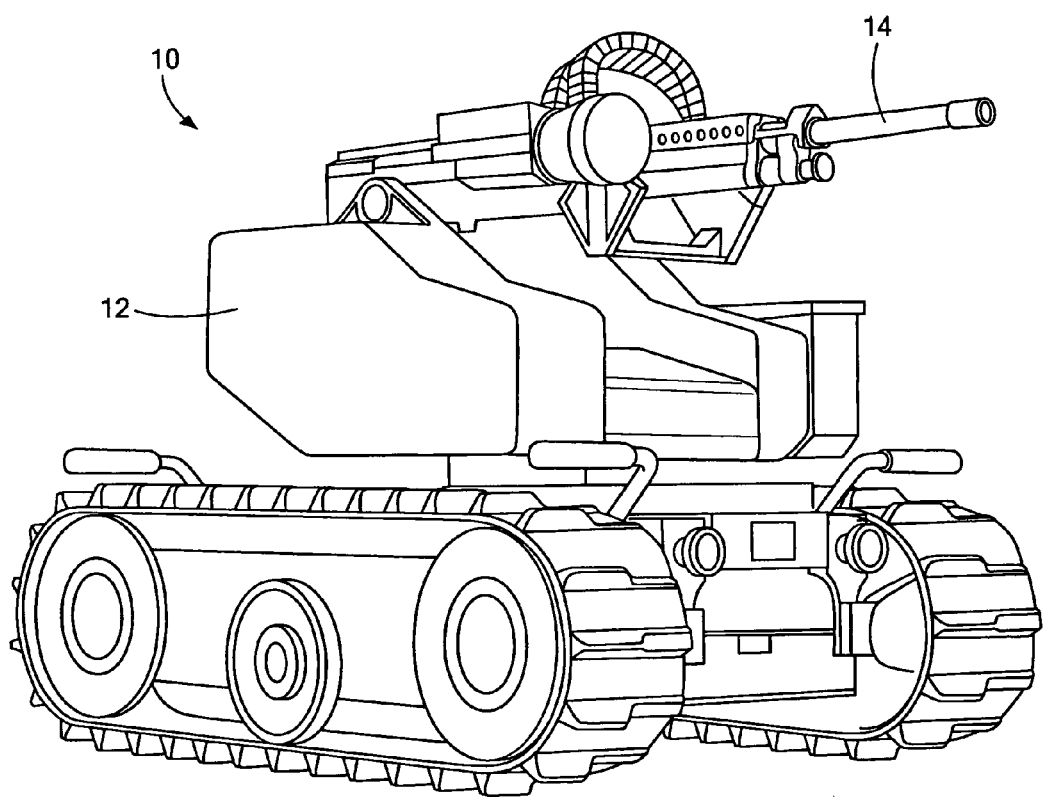
FIG. 3 is a schematic three-dimensional view showing an example of a robot carrying a weapon in accordance with the subject invention.

Thus, in general, control 64 (and/or controller 20) is configured or programmed to determine the position of the robot step 100, FIG. 2. to determine the orientation of the turret and weapon, step 102, and to determine the position of the operator control unit step 104. Based on this information, it can be determined, as shown in step 108, if the weapon is aimed at the operator control unit position. If not, normal procedures can be carried out as shown at step 109 including maneuvering the robot, firing the weapon, and the like.

Figure 5:
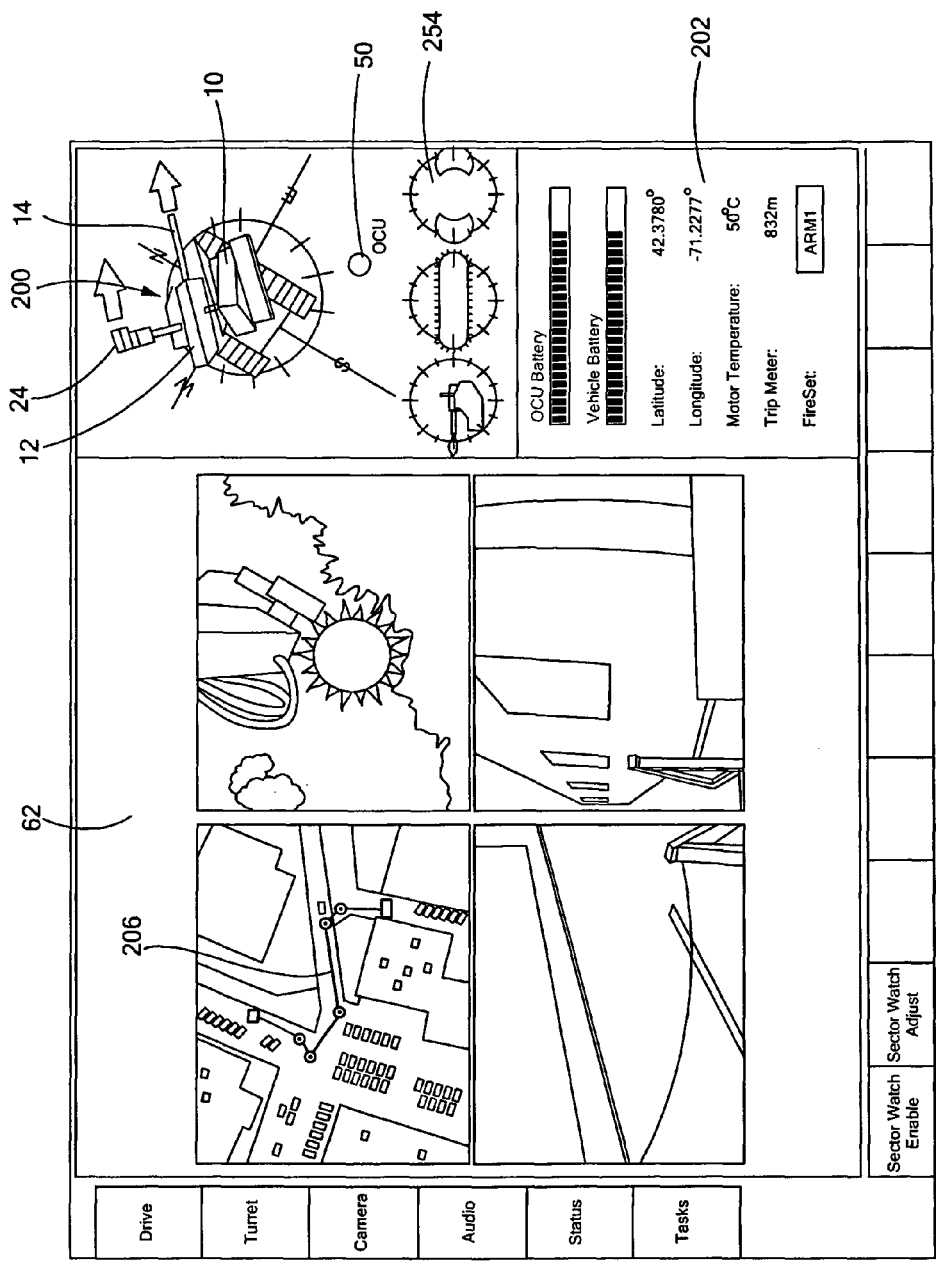
FIG. 5 is a schematic depiction of an operator control unit user interface monitor screen in accordance with the subject invention.

A graphical display module 106 displays on monitor 62, FIG. 4 a three-dimensional depiction 200, FIG. 5 of robot 10, its orientation, the orientation of turret 12 and weapon 14, and the orientation of camera 24. Also depicted is the position of operator control unit 50. The direction of the robot from the operator control unit is shown by reference to the coordinate markings (south, east, north, and west) as shown as is the aiming direction of the weapon and the camera.

In this way, the operator can readily ascertain weather weapon 14 is aimed at the operator's position. The robot's latitude and longitude or grid location is displayed at 202 as is robot and turret roll, pitch, and yaw information as shown at 254. The robot's travel path history can also be depicted as shown at 206.

In addition, operator control unit controller subsystem 64, FIG. 1 can be programmed to take a predetermined action if the weapon is aimed at the OCU within a predetermined fan angle. If the weapon is aimed at the operator control unit's position, step 108, FIG. 2, operator control unit controller subsystem 64 can lock out the fire control subsystem 56, FIG. 1, step 110, FIG. 2 so that any user interface weapon fire command is disabled or ignored. In this way, if the operator uses operator control unit 50, FIG. 4 to fire the weapon and the weapon is aimed at the operator control unit, the weapon will not fire. Also, or alternatively, operator control unit controller subsystem 64 can issue an alert, step 112, FIG. 2 notifying the operator that the weapon is aimed at the operator control unit.

Figure 6A:
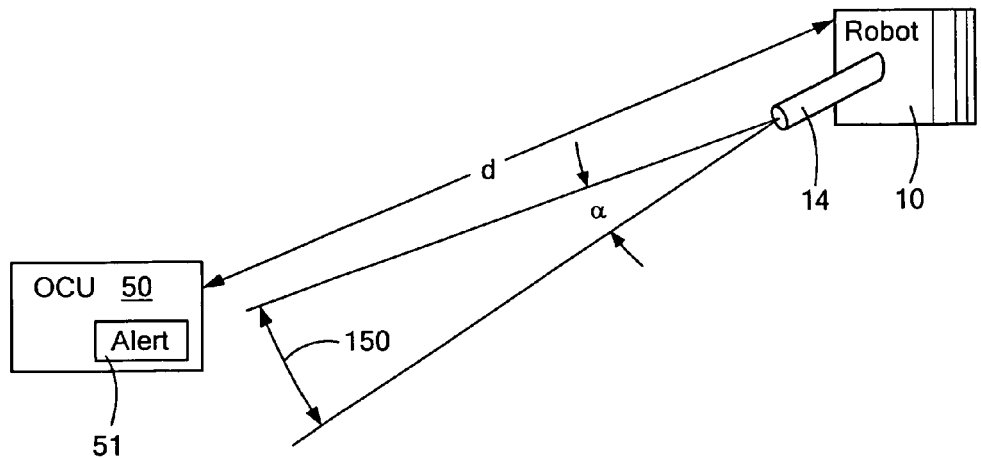
FIG. 6A is a schematic drawing showing a robot with its weapon aimed at an operator control unit and an alert generated in accordance with the subject invention.
Figure 6B:
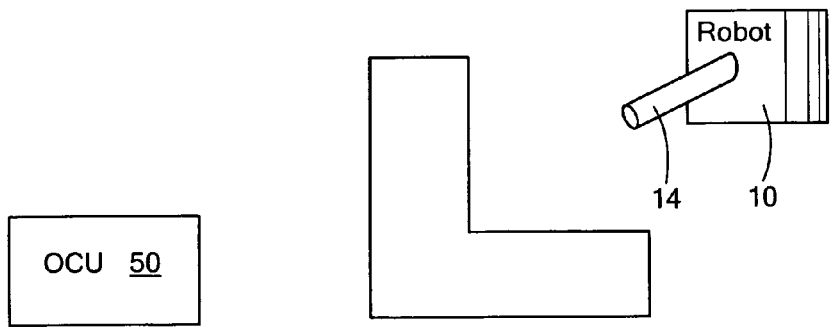
FIG. 6B is a schematic depiction showing a scenario where it may be desirable to override the weapon lock out even though the robot weapon is aimed at the operator control unit.

As shown in FIG. 6A, the controller subsystem has determined that weapon 14 of robot 10 is aimed at operator control unit 50 (within a predetermined fan angle or arc distance 150) and an alert 51 is displayed on operator control unit 50. If the fire control subsystem is locked out, however, there may be instances where an override is necessary as shown at step 114, FIG. 2. As shown in FIG. 6B, robot 10 weapon 14 is aimed at operator control unit 50 as determined by the controller subsystem, but firing of the weapon is determined by the operator to be safe due to the presence of building 300 between operator control unit 50 and robot 10. In such a scenario, the operator can override the weapon fire disabling function by implementing the appropriate fire command sequence and still safely fire weapon 14.

Operator control unit 50 may include an override switch or input which, when activated, allows the weapon to be fired even if it is aimed at the operator control unit. If the override switch is not activated, firing of the weapon is typically not possible if the weapon is aimed at the operator control unit.

Note also that arc distance 150, FIG. 6A varies as a function of the distance d between robot 10 and operator control unit 50 and arc angle $\alpha$. Thus, the controller of robot 10 (and/or the controller of operator control unit 50) can be programmed to determine the turret orientation based on compass 21, FIG. 1 and position encoders 16, determine the robot's position based on GPS receiver 18, and determine the position of operator control unit 50 based on GPS receiver 70. The distance d, FIG. 6A from robot 10 to operator control unit 50 is then calculated or determined.

The arc angle $\alpha$ is then calculated. If the operator control unit override switch is activated, firing of weapon subsystem 14, Fig. is possible regardless of the arc distance. If, however, the override switch is not activated, controller 20 can set a limit for the turret angle based on the calculated arc angle and control turret subsystem 12 accordingly so the turret does not aim the robot weapon in the direction of the operator control unit within a predetermined fan angle or arc distance regardless of how the robot maneuvers.

In some embodiments, it may not be necessary for the controller subsystem to know the actual position of the robot, or even the actual position of the operator control unit—instead all that need be determined is whether or not the robot weapon is aimed at the operator control unit. Also, position determination/navigation subsystems other than GPS units may be used in accordance with the subject invention including, but not limited to, cellular telephone/cell tower triangulation technology and the like. Communications between the OCU and the robot can also take forms other than the transceivers (26 and 66, FIG. 1) disclosed above.

In the event of a loss of GPS data or a loss of robot position data (i.e. compass, turret position, etc.), an operator alert can be generated with an automatic lock out of fire control subsystem 56, FIG. 1 with an override option by the operator.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A mobile, remotely controlled robot system comprising:
   a mobile, remotely controlled robot including:
   a turret subsystem,
   a weapon mounted to the turret subsystem,
   a robot controller subsystem configured to control the robot, control the turret, and fire the weapon, a robot navigation subsystem configured to determine the position of the robot, a turret orientation determination subsystem, and a robot communications subsystem for receiving commands and for transmitting robot position data and turret orientation data; and an operator control unit including:

a user interface for commanding the robot, the turret, and the weapon, an operator control unit communications subsystem for transmitting commands to the robot and for receiving robot position data and turret orientation data from the robot, an operator control unit navigation subsystem configured to determine the position of the operator control unit, and an operator control unit controller subsystem responsive to the robot position data, turret orientation data, and the operator control unit position and configured to determine if the weapon is aimed at the operator control unit within a predetermined fan angle, and wherein the operator control unit controller subsystem is configured to take a predetermined action if the weapon is aimed at the operator control unit within the predetermined fan angle.

2. The robot system of claim 1 in which said action includes providing an alert to the user interface.

3. The robot system of claim 1 in which said action includes disabling any user interface weapon command so the weapon cannot be fired.

4. The robot system of claim 1 in which said predetermined fan angle is between 0° and 10°.

5. The robot system of claim 1 in which the user interface includes a monitor and the operator control unit controller subsystem is further configured to display on the monitor a graphical representation of the robot turret relative to the location of the operator control unit.

6. The robot system of claim 5 in which the operator control unit controller subsystem is further configured to display a graphical representation of the robot and the orientation of the turret relative to the robot.

7. The robot system of claim 5 in which the operator controller subsystem is further configured to display a graphical representation of the direction of the robot from the operator control unit.

8. The robot system of claim 5 in which the robot further includes at least one camera and a camera orientation determination subsystem, the operator control unit controller subsystem is responsive to the camera orientation determination subsystem and is configured to display a graphical representation of the orientation of the camera.

9. A mobile, remotely controlled robot system comprising:
a mobile, remotely controlled robot including:
a weapon mounted to the robot,
a robot controller subsystem configured to fire the weapon,
a weapon orientation determination subsystem, and
a robot communication subsystem for receiving commands and transmitting weapon orientation data; and
an operator control unit including:
a user interface for commanding the robot and the weapon,
a communication subsystem for transmitting commands to the robot and for receiving weapon orientation data from the robot; and
an operator control unit controller subsystem responsive to weapon orientation data and configured to determine if the weapon is aimed at the operator control unit, and wherein the operator control unit controller subsystem is configured to take a predetermined action if the weapon is aimed at the operator control unit within a predetermined fan angle.

10. The system of claim 9 in which the weapon is mounted to the robot via a turret subsystem and the weapon orientation determination subsystem includes encoders which keep track of the position of the turret.

11. The system of claim 9 in which the robot further includes a navigation subsystem configured to determine the position of the robot.

12. The system of claim 9 in which the operator control unit includes a navigation subsystem configured to determine the position of the operator control unit.

13. A mobile, remotely controlled robot system comprising:
A mobile, remotely controlled robot system comprising:
a mobile, remotely controlled robot including:
a turret subsystem,
a weapon mounted to the turret subsystem,
a robot controller subsystem configured to control the robot, control the turret, and fire the weapon,
means for determining the position of the robot,
means for determining the orientation of the turret, and
a robot communication subsystem for receiving commands and transmitting robot position data and turret orientation data; and
an operator control unit including:
a user interface for commanding the robot, the turret, and the weapon, a communication subsystem for transmitting commands to the robot and for receiving robot position data and turret orientation data from the robot,
means for determining the position of the operator control unit, and
means for determining if the weapon is aimed at the operator control unit responsive to the robot position data, turret orientation, and the operator control unit position,
wherein the operator control unit controller subsystem is configured to take a predetermined action if the weapon is aimed at the operator control unit within a predetermined fan angle.

14. A mobile, remotely controlled robot system comprising:
a mobile, remotely controlled robot including:
a turret subsystem,
a robot controller subsystem configured to control the robot, control the turret, and fire a weapon,
a robot navigation subsystem configured to determine the position of the robot,
a turret orientation determination subsystem, and
a robot communications subsystem for receiving commands and for transmitting robot position data and turret orientation data; and
an operator control unit including:
a user interface for commanding the robot, the turret, and the weapon and including a monitor;
an operator control unit communications subsystem for transmitting commands to the robot and for receiving robot position data and turret orientation data from the robot,
an operator control unit navigation subsystem configured to determine the position of the operator control unit, and
an operator control unit controller subsystem responsive to the robot position data, turret orientation data, and the operator control unit position and configured to display on the monitor a graphical representation of the turret relative to the location of the operator control unit and a graphical representation of the robot and the orientation of the turret relative to the robot, and wherein the operator control unit controller subsystem is configured to take a predetermined action if the weapon is aimed at the operator control unit within a predetermined fan angle.

15. A mobile, remotely controlled robot system comprising:
   a mobile, remotely controlled robot including:
      a turret subsystem,
      a robot controller subsystem configured to control the robot, control the turret, and fire the weapon,
      a robot navigation subsystem configured to determine the position of the robot,
      a turret orientation determination subsystem, and
      a robot communications subsystem for receiving commands and for transmitting robot position data and turret orientation data; and
   an operator control unit including:
      a user interface for commanding the robot, the turret, and the weapon,
      an operator control unit communications subsystem for transmitting commands to the robot and for receiving robot position data and turret orientation data from the robot,
      an operator control unit navigation subsystem configured to determine the position of the operator control unit, and
      an operator control unit controller subsystem responsive to the robot position data, turret orientation data, and the operator control unit position and configured to take a predetermined action if the weapon is aimed at the operator control unit within a predetermined fan angle.

16. The robot system of claim 15 in which said action includes providing an alert to the user interface.

17. The robot system of claim 15 in which said action includes disabling any user interface weapon command so the weapon cannot be fired.

* * * * *